(12) United States Patent
Graves et al.

(10) Patent No.: US 11,264,658 B2
(45) Date of Patent: Mar. 1, 2022

(54) HEAT EXCHANGER WITH INTERNAL COLD FLUID DISTRIBUTION FEATURES FOR COOLING MULTIPLE ROWS OF BATTERY CELLS

(71) Applicant: Dana Canada Corporation, Oakville (CA)

(72) Inventors: Garreth D. G. Graves, Oakville (CA); Sina Kaiser-Krug, Neu-Ulm (DE)

(73) Assignee: Dana Canada Corporation, Oakville (CA)

( * ) Notice: Subject to any disclaimer, the term of this patent is extended or adjusted under 35 U.S.C. 154(b) by 228 days.

(21) Appl. No.: 16/663,140

(22) Filed: Oct. 24, 2019

(65) Prior Publication Data

US 2020/0136214 A1 Apr. 30, 2020

Related U.S. Application Data

(60) Provisional application No. 62/773,464, filed on Nov. 30, 2018.

(30) Foreign Application Priority Data

Oct. 25, 2018 (DE) .......................... 202018004979.4

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/6554; H01M 10/6568;
(Continued)

(56) References Cited

U.S. PATENT DOCUMENTS 6,309,773 B1 * 10/2001 Rock ................... H01M 8/0247
429/443
6,528,196 B1 * 3/2003 Fujii ................... H01M 8/2457
429/454

(Continued)

*Primary Examiner* — Len Tran
*Assistant Examiner* — Gustavo A Hincapie Serna
(74) *Attorney, Agent, or Firm* — McCoy Russell LLP

(57) ABSTRACT

A heat exchanger for cooling multiple rows of battery cells has a plurality of longitudinal flow sections defining at least first and second U-shaped flow areas, each underlying a row of battery cells. The flow sections includes inlet and outlet flow sections, and at least two intermediate flow sections. Inlet and outlet ports are in flow communication with the respective inlet and outlet flow sections, and a first bypass channel extends between the inlet port and at least one of the intermediate flow sections. The first bypass channel supplies relatively cold heat transfer fluid from the inlet to mix with warmer fluid in a second or subsequent U-shaped flow area, to improve temperature uniformity between the rows of battery cells. A second bypass channel may extend around the outer periphery of the heat exchanger, from the inlet flow section to a second or subsequent U-shaped flow area.

20 Claims, 11 Drawing Sheets

(51) Int. Cl.
 *H01M 10/625* (2014.01)
 *H01M 10/6554* (2014.01)
 *H01M 10/6568* (2014.01)

(52) U.S. Cl.
 CPC ... *H01M 10/6554* (2015.04); *H01M 10/6568* (2015.04); *H01M 2220/20* (2013.01)

(58) Field of Classification Search
 CPC .......... H01M 2220/20; H01M 6/5038; H01M 10/6552; H01M 10/6565; H01M 10/6566; H01M 10/6567; H01M 10/617; Y02E 60/10; Y02E 60/50; F28F 3/00; F28F 3/12; F28F 3/14; F28F 13/00; F28D 1/03; F28D 1/0308
 USPC ....................................................... 165/80.4
 See application file for complete search history.

(56) References Cited

U.S. PATENT DOCUMENTS

| | | | |
|---|---|---|---|
| 9,368,845 B2 | 6/2016 | Jairazbhoy et al. | |
| 9,618,271 B2 | 4/2017 | Diem et al. | |
| 9,627,724 B2 | 4/2017 | Yum et al. | |
| 9,653,763 B2 | 5/2017 | Wayne et al. | |
| 9,887,437 B2 | 2/2018 | Palanchon | |
| 9,903,661 B2 | 2/2018 | Odillard et al. | |
| 10,158,151 B2 | 12/2018 | Kenney et al. | |
| 2005/0064272 A1* | 3/2005 | Frank | H01M 8/0258 429/508 |
| 2009/0114373 A1 | 5/2009 | Sawaguchi et al. | |
| 2009/0258289 A1* | 10/2009 | Weber | H01M 10/613 429/120 |
| 2013/0034767 A1 | 2/2013 | Pentapati et al. | |
| 2013/0143093 A1* | 6/2013 | Teng | H01M 10/625 429/120 |
| 2014/0138075 A1 | 5/2014 | Yang et al. | |
| 2015/0086831 A1* | 3/2015 | Haussmann | H01M 10/6556 429/120 |
| 2016/0036104 A1* | 2/2016 | Kenney | H01M 10/6557 429/120 |
| 2016/0204486 A1 | 7/2016 | Kenney et al. | |
| 2016/0359211 A1* | 12/2016 | Kenney | F28F 3/12 |
| 2017/0122679 A1* | 5/2017 | Kenney | H01M 10/647 |
| 2017/0194679 A1* | 7/2017 | Chakraborty | F28F 3/12 |
| 2018/0131051 A1 | 5/2018 | Paramasivam et al. | |
| 2019/0331426 A1* | 10/2019 | Granryd | F28D 9/005 |
| 2020/0006822 A1* | 1/2020 | Shisler | F28D 9/005 |
| 2021/0071961 A1* | 3/2021 | Galland | F28F 9/0075 |

* cited by examiner

HEAT EXCHANGER WITH INTERNAL COLD FLUID DISTRIBUTION FEATURES FOR COOLING MULTIPLE ROWS OF BATTERY CELLS

CROSS-REFERENCE TO RELATED APPLICATIONS

This application claims priority to and the benefit of German Utility Model Application No. DE202018004979.4 filed Oct. 25, 2018; and U.S. Provisional Patent Application No. 62/773,464 filed Nov. 30, 2018, the contents of which are incorporated herein by reference.

TECHNICAL FIELD

The present disclosure relates to thermal management of rechargeable batteries within an energy storage system of a battery electric vehicle (BEV) or hybrid electric vehicle (HEV), and particularly to heat exchangers adapted for cooling multiple rows of rechargeable battery cells.

BACKGROUND

Energy storage systems such as those used in BEVs and HEVs comprise rechargeable lithium-ion batteries. A typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that needs to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In contrast, ICE plate heat exchangers are arranged or "sandwiched" between the adjacent pouch cells or prismatic cells, the individual ICE plate heat exchangers being fluidically connected together by common inlet and outlet manifolds. Examples of cold plate heat exchangers and ICE plate heat exchangers are described in commonly assigned U.S. patent application Ser. No. 14/972,463 entitled COUNTER-FLOW HEAT EXCHANGER FOR BATTERY THERMAL MANAGEMENT APPLICATIONS (Publication No. US 2016/0204486 A1), which is incorporated herein by reference in its entirety.

Temperature uniformity across the surface of battery heat exchangers is an important consideration in the thermal management of these types of battery units or overall battery systems as temperature uniformity across the surface of the heat exchanger relates to ensuring that there is a minimum temperature differential within the individual battery cells and between adjacent battery cells of the vehicle battery. Ensuring adequate temperature uniformity is a challenging aspect of heat exchanger design since the temperature of the heat transfer fluid is higher at the outlet than at the inlet.

Maintaining adequate temperature uniformity within individual battery cells and between adjacent rows of battery cells is particularly difficult, for example, in U-flow heat exchanger configurations where a first row of battery cells is arranged in contact with an inlet side of the heat exchanger and a second row of battery cells is arranged in contact with an outlet side of the heat exchanger.

There is a need for battery heat exchangers which achieve improved temperature uniformity across the surfaces which are in contact with the battery cells.

SUMMARY

In accordance with an aspect of the present disclosure, there is provided a heat exchanger having a length and a width and comprising a plurality of flow sections separated by flow barriers. Each flow section has a first end and a second end spaced apart along the length of the heat exchanger. The flow sections are arranged side-by-side along the width of the heat exchanger and adjacent pairs of flow sections are in flow communication with each other through openings in the flow barriers. The plurality of flow sections includes an inlet flow section, an outlet flow section, and at least first and second intermediate flow sections between the inlet flow section and the outlet flow section.

The heat exchanger further comprises: an inlet port in flow communication with a first end of the inlet flow section; an outlet port in flow communication with the outlet flow section; and a first bypass channel extending between the inlet port and at least one of the intermediate flow sections.

According to an aspect, the heat exchanger further comprises an even number of intermediate flow sections, such that the heat exchanger defines a plurality of U-shaped flow areas, and such that the outlet port is in flow communication with the first end of the outlet flow section.

According to an aspect, the plurality of U-shaped flow areas comprises a first U-shaped flow area and a second U-shaped flow area. The first U-shaped flow area comprises the inlet flow section and a first intermediate flow section, wherein a first opening provides flow communication between the second end of the inlet flow section and the first intermediate flow section. The second U-shaped flow area comprises a second intermediate flow section and the outlet flow section, wherein a third opening provides flow communication between the second end of the second intermediate flow section and the outlet flow section.

According to an aspect, the first bypass channel extends transversely from the inlet port to the first end of at least one of the first and second intermediate flow sections.

According to an aspect, the first bypass channel extends transversely from the inlet port to a second opening through which flow communication is provided between the first end of the first intermediate flow section and the first end of the second intermediate flow channel.

According to an aspect, the heat exchanger further comprises a second bypass channel which branches off from the first U-shaped flow area and extends to the second U-shaped flow area.

According to an aspect, the second bypass channel has a first end in flow communication with the inlet flow section between the first and second ends thereof, and a second end in flow communication with the outlet flow section between the first and second ends thereof.

According to an aspect, the heat exchanger comprises a first flat plate and a second shaped plate having an outer peripheral flange along which it is sealingly joined to the first plate. The heat exchanger has a pair of opposed, longitudinally-extending side edges and a pair of opposed, transversely-extending end edges; wherein the second bypass channel extends longitudinally along one a first one of the side edges, between the inlet flow section and the outer peripheral flange of the second plate; and wherein the second bypass channel further extends transversely along one of the end edges, between the second ends of the flow sections and the peripheral flange of the second plate.

According to an aspect, the second end of the second bypass channel is located at the second end of the second intermediate flow section, the second end of the outlet flow section, and/or the third opening between the second ends of the second intermediate flow section and the outlet flow section.

According to an aspect, the second bypass channel further extends longitudinally along a second one of the side edges, between the outlet flow section and the outer peripheral flange of the second plate.

According to an aspect, the second end of the second bypass channel is located between the first and second ends of the outlet flow section.

According to an aspect, the second end of the second bypass channel is located at the first end of the outlet flow channel, and/or proximate to the outlet port.

According to an aspect, each of the flow sections defines a heat transfer area defined as an area of the flow section adapted to permit flow therethrough of a heat transfer fluid; wherein the inlet flow section has a smaller heat transfer area than the first intermediate flow section; and wherein the second intermediate flow section has a smaller heat transfer area than the outlet flow section.

According to an aspect, the heat exchanger comprises a first flat plate and a second shaped plate having an outer peripheral flange along which it is sealingly joined to the first plate; wherein the second plate includes one or more embossments in the inlet flow section and the second intermediate flow section which are adapted to reduce the heat transfer area in each of the inlet flow section and the second intermediate flow section relative to the respective first intermediate flow section and the outlet flow section.

According to an aspect, the second plate includes first and second flow obstructing embossments, wherein the first flow obstructing embossment is located at the first end of the inlet flow section, and the second flow obstructing embossment is located at the first end of the second intermediate flow section.

According to an aspect, each of the flow sections comprises a plurality of channel ribs which divide each of the flow sections into a plurality of longitudinally extending flow channels.

According to an aspect, the number and/or width of the channel ribs is varied between the inlet flow section and the first intermediate flow section, and/or between the second intermediate flow section and the outlet flow section.

According to an aspect, the number of channel ribs in the inlet flow section is less than the number of channel ribs in the first intermediate flow section; and/or the number of channel ribs in the second intermediate flow section is less than the number of channel ribs in the outlet flow section.

According to an aspect, at least one of the channel ribs in the inlet flow section is wider than each of the channel ribs in the first intermediate flow section; and/or at least one of the channel ribs in the second intermediate flow section is wider than each of the channel ribs in the outlet flow section.

According to an aspect, the heat exchanger comprises a first flat plate and a second shaped plate having an outer peripheral flange along which it is sealingly joined to the first plate, the heat exchanger having a pair of opposed, longitudinally-extending side edges and a pair of opposed, transversely-extending end edges. Each of the first and second U-shaped flow areas is adapted to underly a row of battery cells provided in thermal contact with an outer surface of the first flat plate of the heat exchanger.

According to an aspect, the inlet and outlet ports are provided in the first plate and are located in a central area of the heat exchanger, outside an area of the first plate which is adapted to be in thermal contact with the battery cells.

According to an aspect, the inlet and outlet ports are located along a transverse mirror plane which bisects the heat exchanger into first and second portions; and wherein the first and second portions are mirror images of one another.

According to an aspect, the first end of each flow section is located in the central area of the heat exchanger, and the second end of each flow section is located proximate to one of the end edges.

BRIEF DESCRIPTION OF THE DRAWINGS

Exemplary embodiments of the present disclosure will now be described, by way of example, with reference to the accompanying drawings, in which.

DETAILED DESCRIPTION

Figure 1:
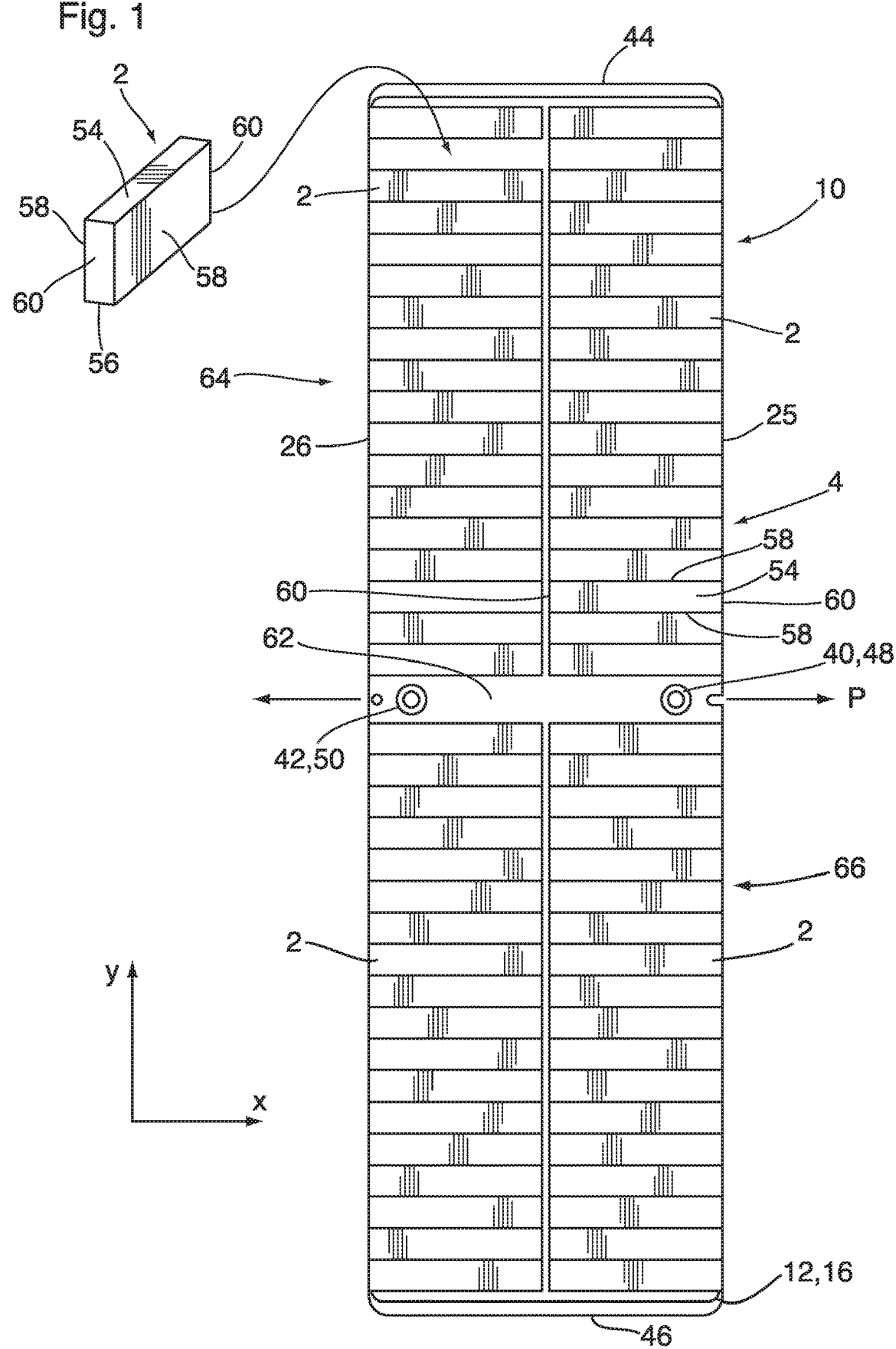
FIG. 1 is a top plan view of a heat exchanger according to a first embodiment.
Figure 2:
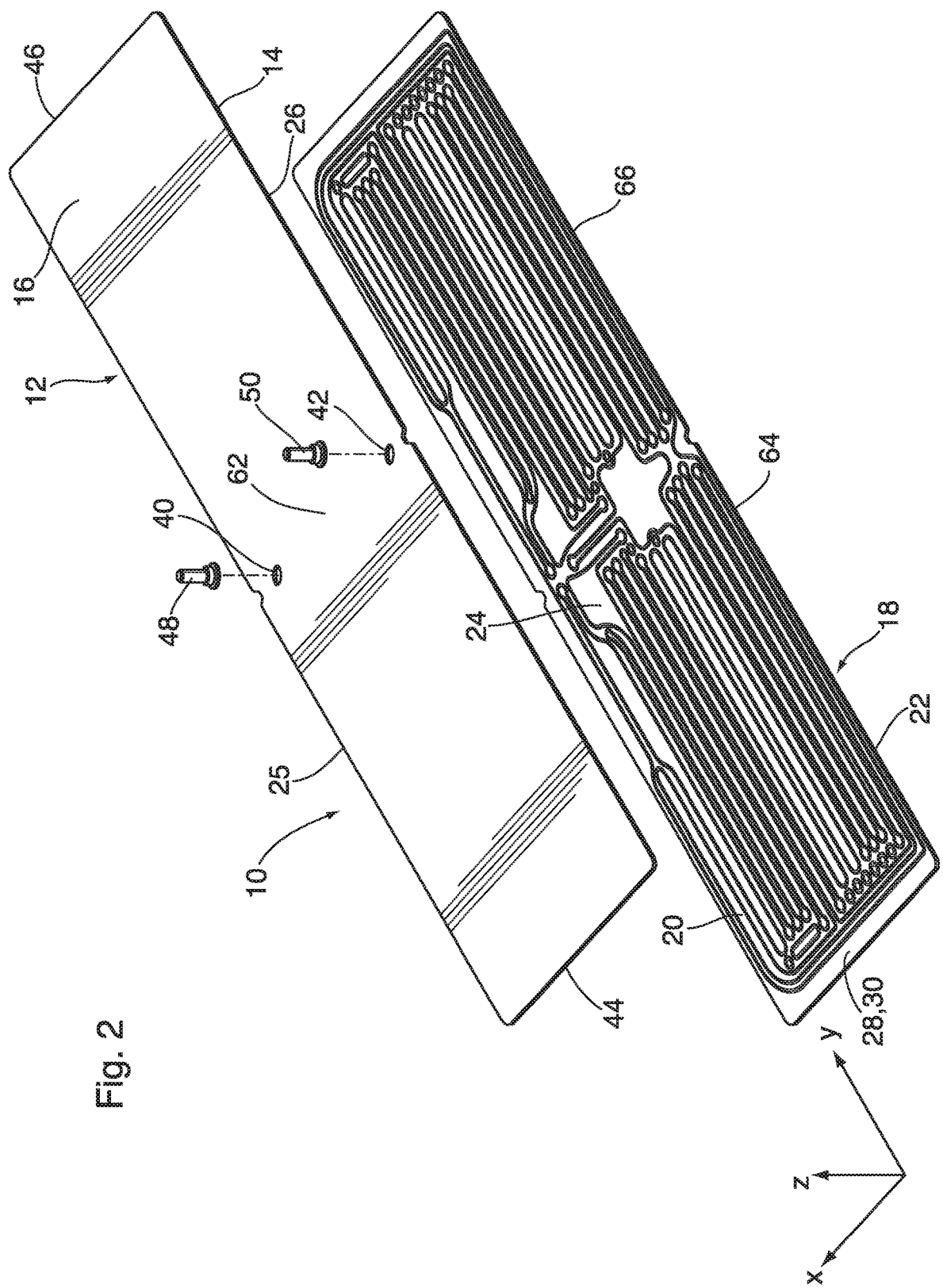
FIG. 2 is an exploded top perspective view of the heat exchanger of FIG. 1.
Figure 3:
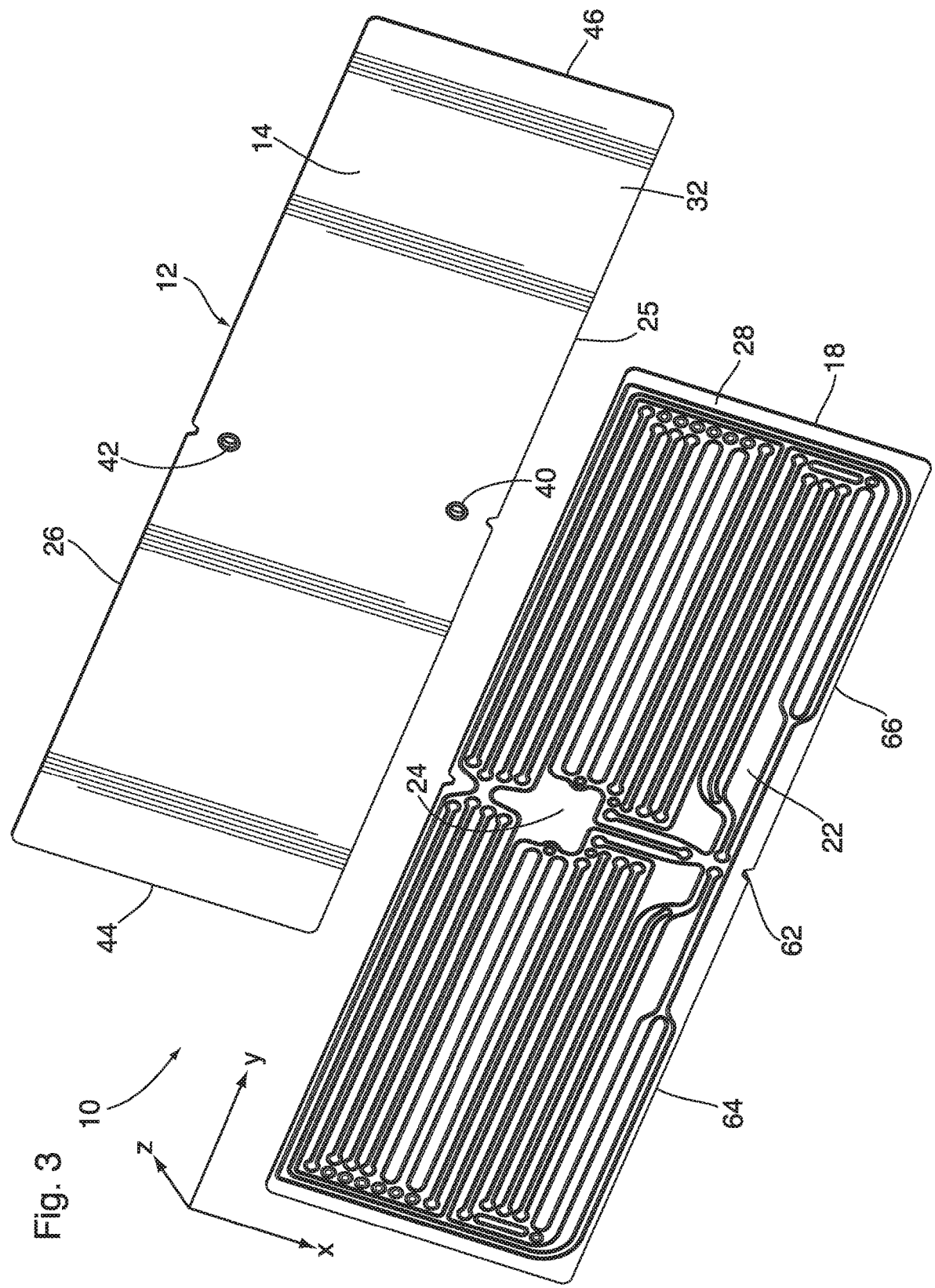
FIG. 3 is an exploded bottom perspective view of the heat exchanger of FIG. 1.

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

In some embodiments, the heat exchangers described herein are specifically adapted for thermal contact with a plurality of battery cells arranged in two or more longitudinally-extending rows.

A heat exchanger 10 according to a first embodiment is shown in FIGS. 1 to 9. Heat exchanger 10 has a length, along a longitudinal axis (y-axis), and a width, along a transverse axis (x-axis). Heat exchanger 10 comprises a first plate 12 having inner and outer surfaces 14, 16 and a second plate 18 having inner and outer surfaces 20, 22. Heat exchanger 10 is a "cold plate" in which the outer surface 16 of the first plate 12 provides a flat surface upon which one or more battery cells 2 and/or battery modules 4 are supported.

FIG. 1 shows a battery module 4 comprising seventy-two prismatic battery cells 2 supported on the outer surface 16 of first plate 12. The battery cells 2 are arranged in two longitudinally-extending (along y-axis) rows of thirty-six cells, with the two rows being in side-by-side arrangement. Each row of thirty-six cells comprises two groups of eighteen cells, with the two groups of cells 2 in each row being spaced longitudinally from one another as further discussed below.

Each battery cell 2 has a plurality of rectangular surfaces, including a top surface 54, a bottom surface 56, a pair of opposed side surfaces 58, and a pair of opposed end surfaces 60. The bottom surfaces 56 are in thermal contact with the outer surface 16 of first plate 12. Although not shown, the battery cells 2 are electrically connected together, and the battery module 4 is electrically connected to other battery modules of the vehicle battery. It will be appreciated that the total number of battery cells 2 may vary from that shown in the drawings, and that the cells 2 may be arranged in more than two longitudinal rows.

A thin layer of thermal interface material (TIM) (not shown) may be provided between the outer surface 16 of first plate 12 and the bottom surfaces 56 of the battery cells 2 to enhance thermal contact between the heat exchanger 10 and battery cells 2. The TIM may comprise a thermally conductive grease, wax or metallic material.

The heat exchanger 10 is generally rectangular, being elongated along the longitudinal axis, having a pair of longitudinally extending first and second side edges 25, 26 and a pair of transversely extending first and second end edges 44, 46, wherein side edges 25, 26 and end edges 44, 46 are also referred to herein as the side edges and end edges of the first and second plates 12, 18.

The second plate 18 has opposed inner and outer surfaces 20, 22 and is shaped, for example by stamping, drawing or molding, to provide a plurality of embossments which together define a central area 24 having a plurality of grooves or channels surrounded on all sides by a planar flange 28 defining a planar peripheral sealing surface 30 on the inner surface 20 of second plate 18. The first and second plates 12, 18 are sealingly joined together with their inner surfaces 14, 20 in opposed facing relation to one another, and with portions of the inner surfaces 14, 20 being spaced apart from one another. The planar peripheral sealing surface 30 of second plate 18 is sealingly joined to a planar, peripheral sealing surface 32 on the inner surface 14 of first plate 12, with portions of the inner surfaces 14, 20 inward of respective sealing surfaces 32, 30 being spaced apart from one another.

Heat exchanger 10 further comprises first and second ports 40, 42 comprising apertures in the first plate 12, located inwardly of the planar peripheral sealing surface 32, through which the heat transfer fluid is introduced into and discharged from the heat exchanger 10. The first port 40 is provided with a first tubular fitting 48 and the second port 42 is provided with a second tubular fitting 50, the fittings 48, 50 projecting upwardly from the outer surface 16 of first plate 12, to provide flow communication between the fluid flow passages 34 and a fluid circulation system (not shown) of the vehicle. In the present embodiment, the first port 40 and first fitting 48 are the inlet port and fitting, and the second port 42 and second fitting 50 are the outlet port and fitting.

The ports 40, 42 and fittings 48, 50 are located in a central area 62 of the heat exchanger 10, which is outside the areas occupied by battery cells 2. The central area 62 splits each row of thirty-six battery cells into two groups of eighteen. Although the ports 40, 42 and fittings 48, 50 are located in central area 62 in the present embodiment, the ports 40, 42 and fittings may instead be located along one of the end edges 44, 46 of the heat exchanger 10.

The plates 12, 18 and fittings 48, 50 may be comprised of aluminum or alloys thereof, and may be joined together by brazing in a brazing oven. Although the first and second plates 12, 18 are shown as having the same or similar thickness, the first plate 12 may comprise a heat sink or heat spreader having a thickness which is greater than that of the second plate 18 across at least a portion of its area.

At least some of the channels or grooves in the central area 24 of second plate 18 define the bottoms and sides of a plurality of fluid flow passages of heat exchanger 10. As can be seen from the drawings, the ports 40, 42 are located along a transverse mirror plane P which bisects heat exchanger 10 into first and second portions 64, 66, with the pattern of channels or grooves in the first and second portions 64, 66 being mirror images of one another.

The following is a description of the pattern of channels or grooves in the first portion 64, and the description applies equally to the second portion 66.

Figure 4A:
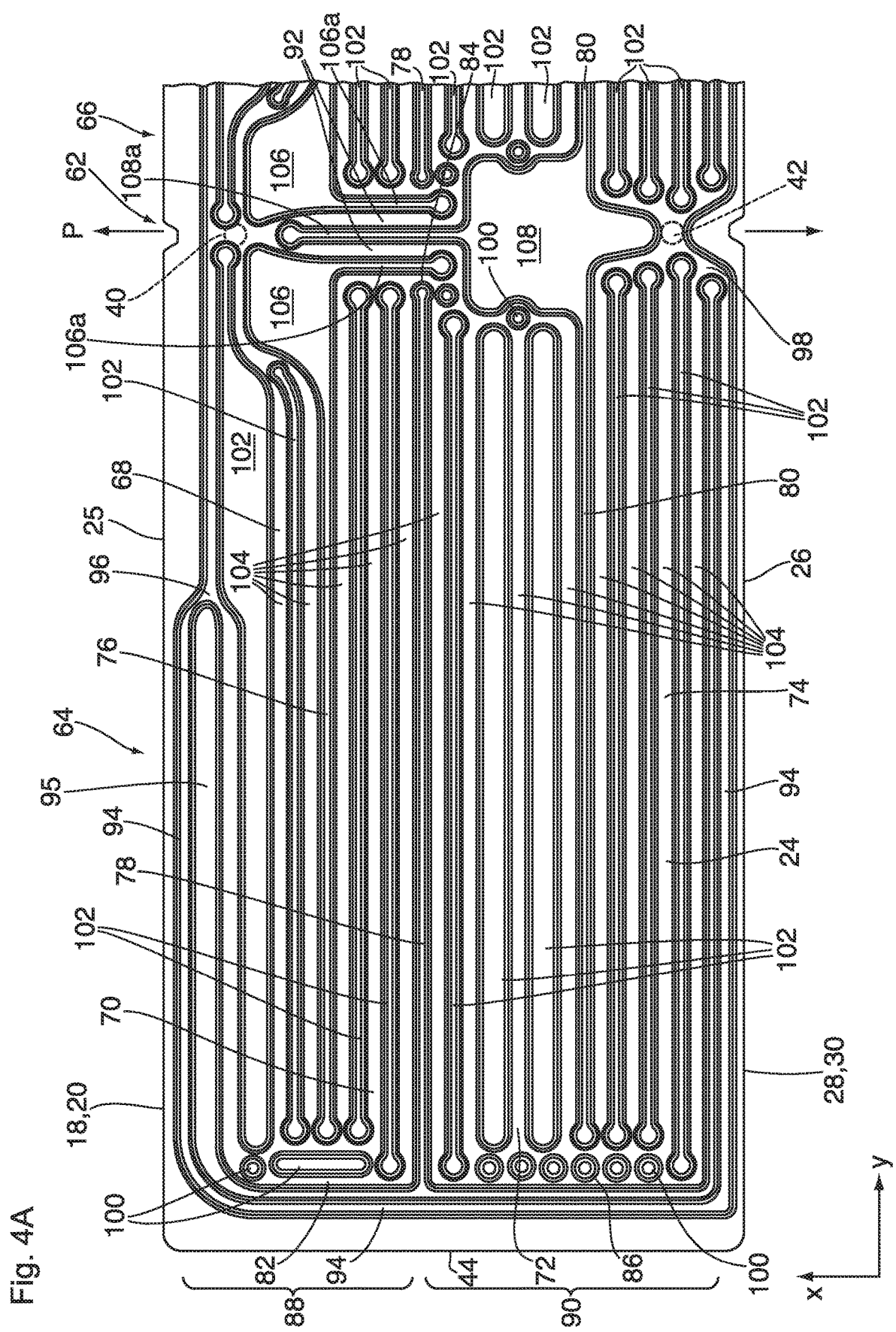
FIG. 4A is an enlarged, partial top plan view showing one end of the bottom plate of the heat exchanger of FIG. 1.
Figure 4B:
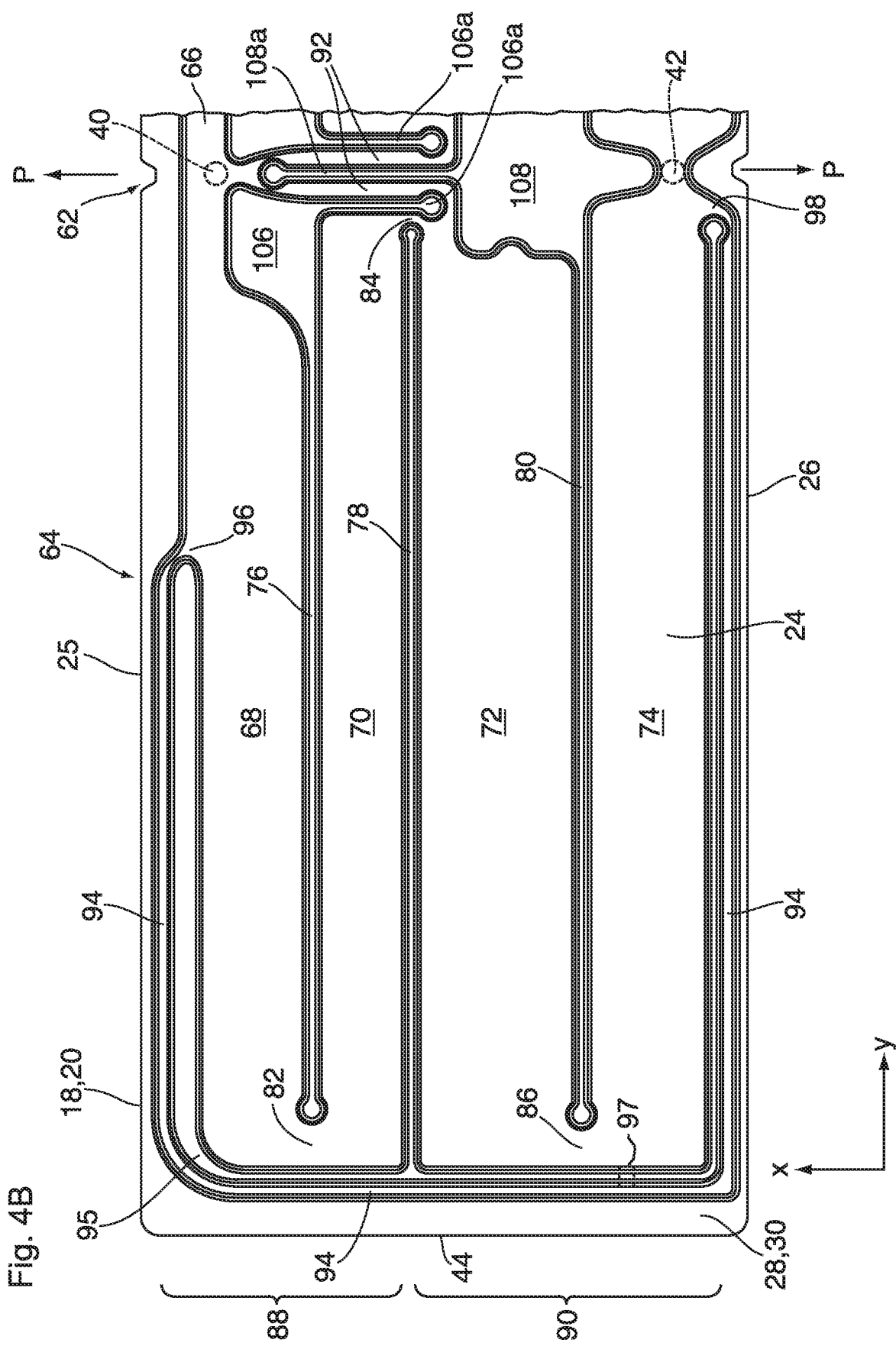
FIG. 4B is an explanatory view in which certain features of FIG. 4A are shown in isolation.
Figure 5:
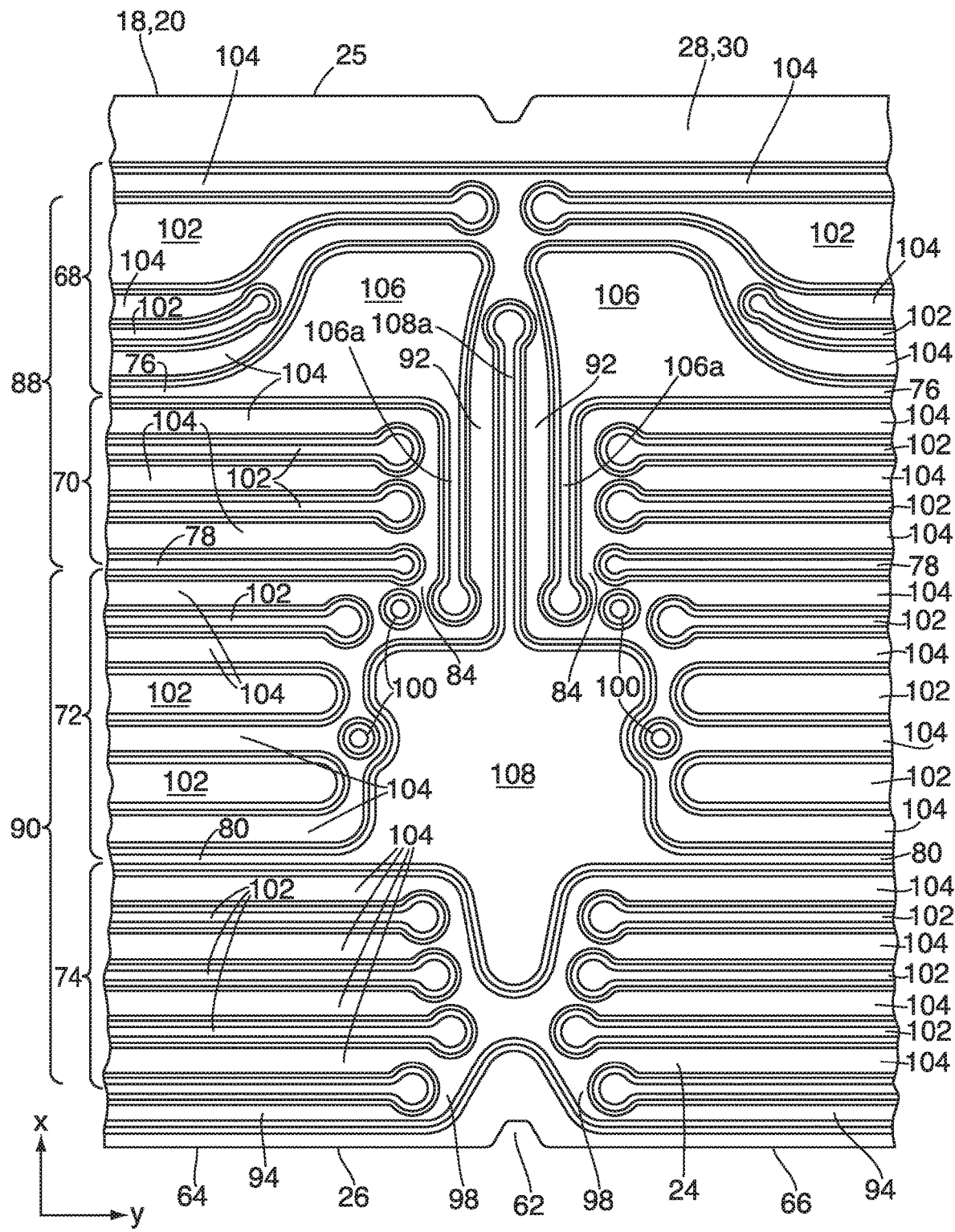
FIG. 5 is an enlarged, partial top plan view showing the middle portion of the bottom plate of the heat exchanger of FIG. 1.
Figure 6:
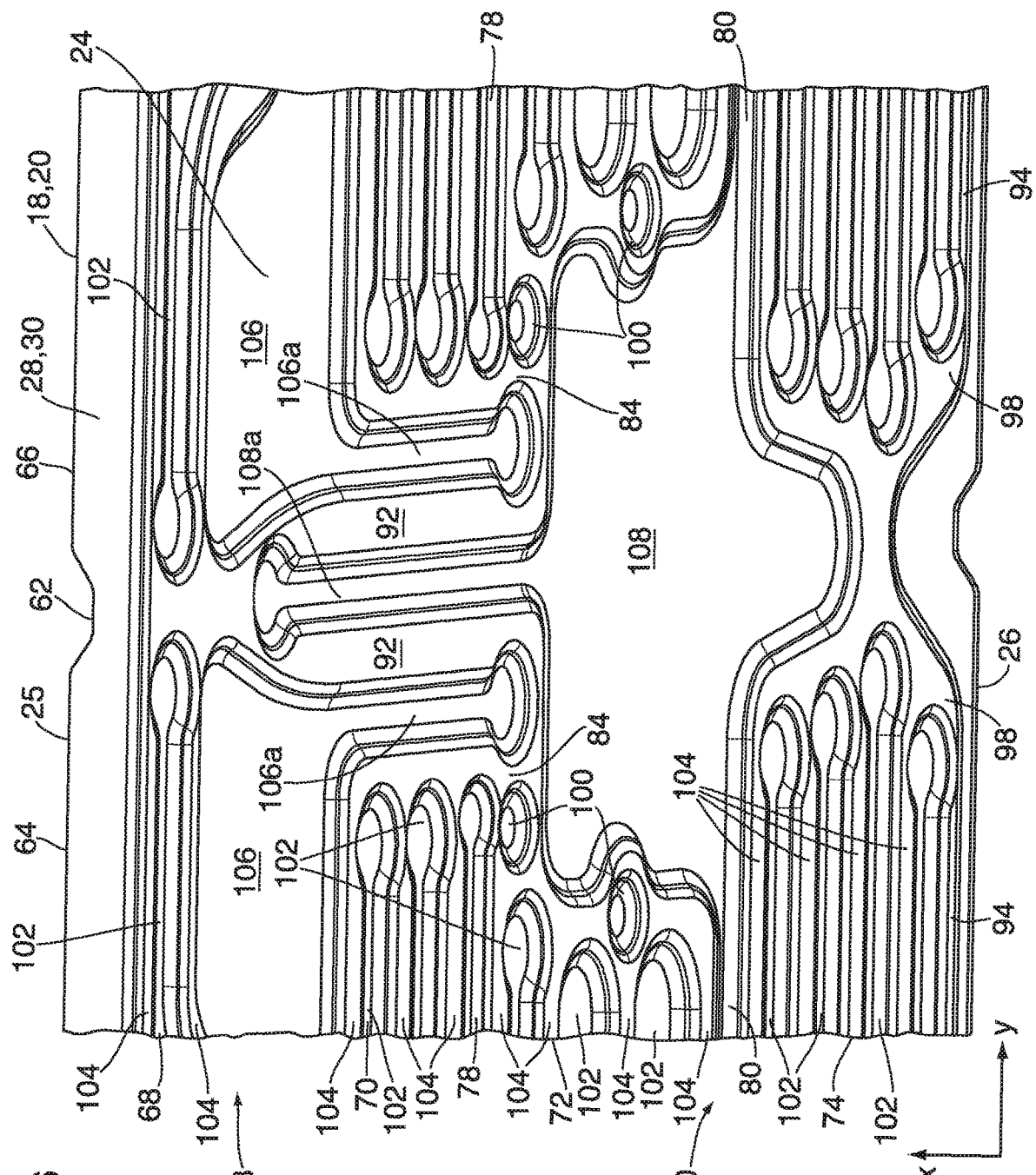
FIG. 6 is an enlarged, partial top perspective view showing the middle portion of the bottom plate of the heat exchanger of FIG. 1.

FIGS. 4A and 4B are top plan views showing part of second plate 18 in the first portion 64 of heat exchanger 10, with the locations of the first (inlet) port 40 and second (outlet) port 42 being superimposed on second plate 18. As can be seen from FIG. 7, an overall W-shaped flow pattern is defined in first portion 64, the W-shaped flow pattern including four longitudinally-extending legs. Alternatively, as can be seen from FIG. 7, the overall flow pattern can be visualized as a pair of U-shaped flow patterns, each of which underlies one of the rows of battery cells 2, the outlines of which can be seen in FIG. 7.

FIG. 4B illustrates in isolation a number of features of second plate 18 which are now described below, while eliminating a number of other features of the second plate 18.

As shown in FIG. 4B, the first portion 64 of heat exchanger 10 defines a plurality of flow sections 68, 70, 72, 74 arranged side-by-side along the width of the heat exchanger 10. Each of the flow sections 68, 70, 72, 74 has a first end and a second end spaced apart along the longitudinal axis, wherein the first end of each flow section is located at the central area 62 of heat exchanger 10, and the second end of each flow section is located proximate to one of the end edges 44, 46 of the heat exchanger 10.

Figure 7:
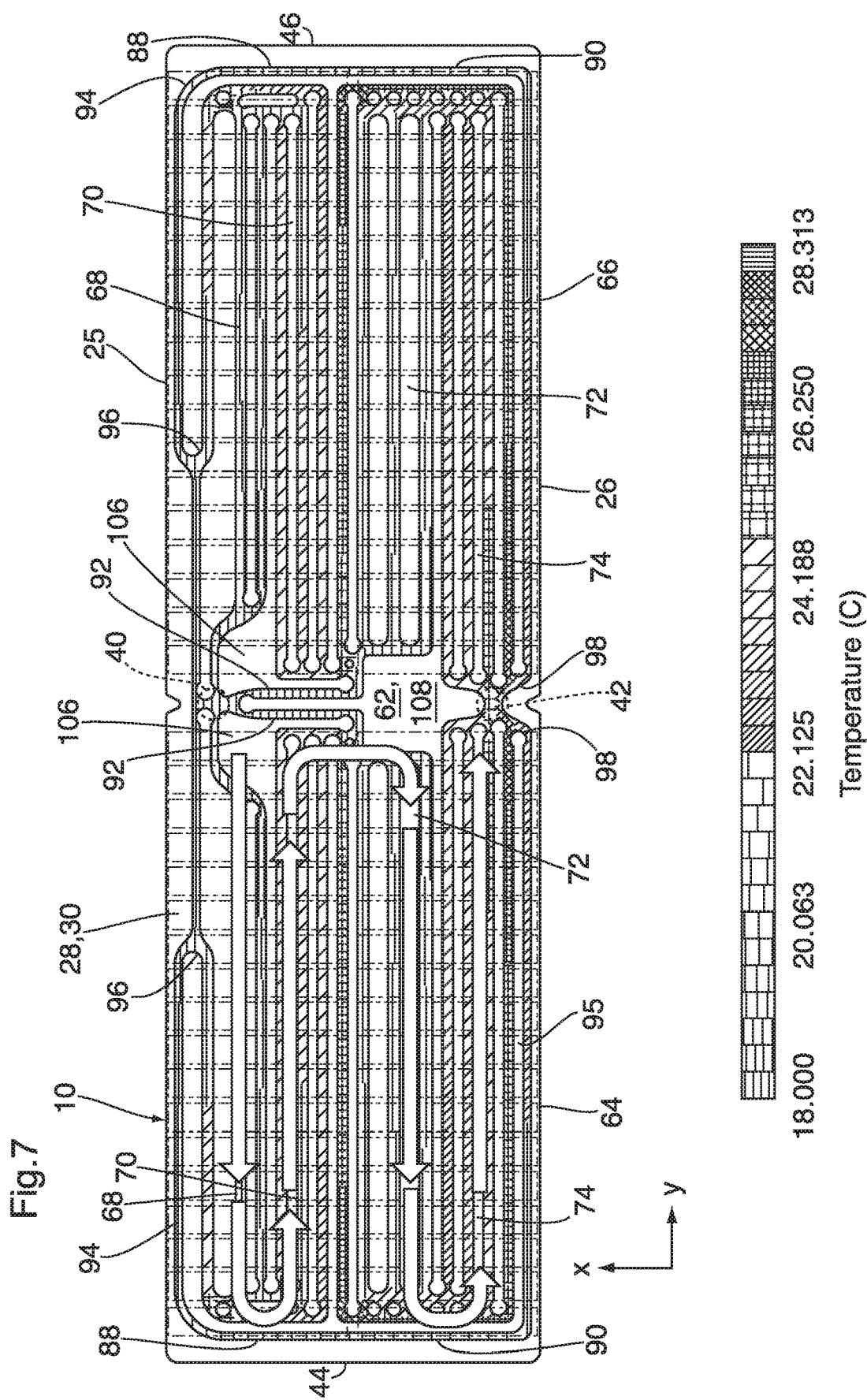
FIG. 7 is an explanatory view showing the overall W-shaped flow path through the heat exchanger of FIG. 1.
Figure 8:
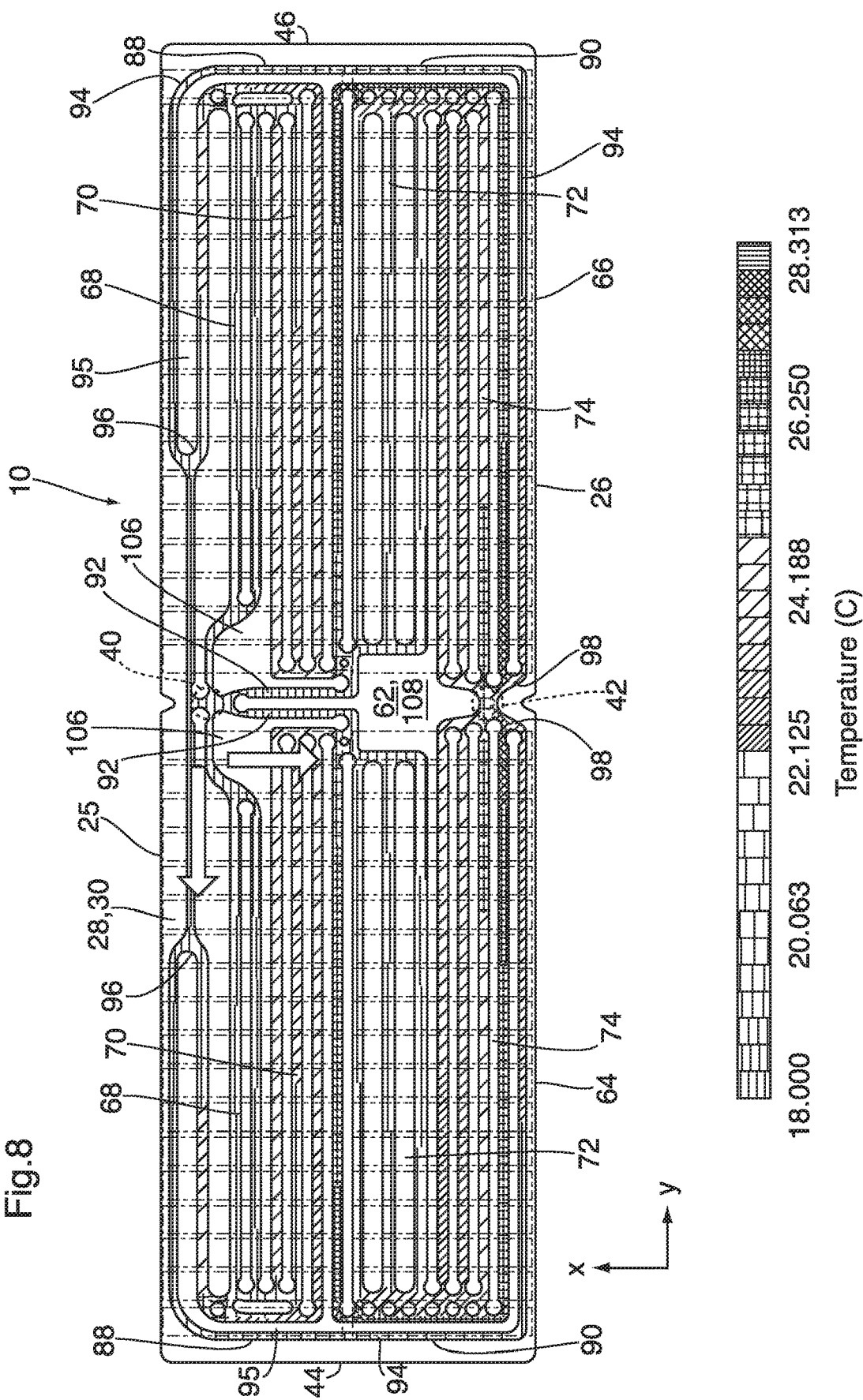
FIG. 8 is an explanatory view showing the bypass flow path in the middle portion of the heat exchanger of FIG. 1.

Each of the flow sections 68, 70, 72, 74 includes one of the longitudinal legs of the W-shaped flow pattern shown in FIG. 7, wherein adjacent flow sections 68, 70, 72, 74 are separated by flow barriers. In this regard, adjacent flow sections 68 and 70 are separated by a first flow barrier 76; adjacent flow sections 70 and 72 are separated by second flow barrier 78; and adjacent flow sections 72 and 74 are separated by third flow barrier 80.

Each of the flow barriers 76, 78, 80 includes an opening through which flow communication is provided between adjacent pairs of flow sections 68, 70, 72, 74. In this regard, the first flow barrier 76 has a first opening 82 providing fluid communication between the second end of the first flow section 68 and the second flow section 70; the second flow barrier 78 has a second opening 84 providing fluid communication between the first end of the second flow section 70 and the first end of the third flow section 72; and the third flow barrier 80 has a third opening 86 providing fluid communication between the second end of the third flow section 72 and the second end of the fourth flow section 74. As can be seen, the openings 82, 84, 86 of consecutive flow barriers 76, 78, 80 are located at opposite ends of the flow sections 68, 70, 72, 74, thereby providing the W-shaped flow pattern between the first and second ports 40, 42.

The first (inlet) port 40 is located at the first end of the first flow section 68, which is also referred to herein as the "inlet flow section". The second (outlet) port 42 is located at the first end of the fourth flow section 74, which is also referred to herein as the "outlet flow section". The second and third flow sections 70, 72 are located between the inlet and outlet flow sections 68, 74, and are each referred to herein as an "intermediate flow section". It will be appreciated that the number of intermediate flow sections can be greater than two, for example in embodiments where more than two rows of battery cells 2 are in thermal contact with the first plate 12. Also, for example where the plurality of flow sections is an odd number, the second port 42 may be located at the second end of the outlet flow section (in both portions 64, 66).

In the present embodiment, a first row of battery cells 2 overlies and is in thermal contact with the first and second flow sections 68, 70, with these two flow sections 68, 70 forming a first U-shaped flow area 88 (FIG. 4A) under the first row of battery cells 2. Similarly, a second row of battery cells 2 overlies and is in thermal contact with the third and fourth flow sections 72, 74, with these two flow sections 68, 70 forming a second U-shaped flow area 90 under the second row of battery cells 2. These two U-shaped flow areas 88, 90 are arranged in series and are separated by the second barrier 78, with the first U-shaped flow area formed by flow sections 68, 70 supplying heat transfer fluid to the second U-shaped flow area formed by flow sections 72, 74, i.e. through the second opening 84 of the second flow barrier 78.

The heat transfer fluid absorbs heat from the first row of battery cells 2 as it flows through the first and second flow sections 68, 70 comprising the first U-shaped flow area 88, increasing the temperature of the heat transfer fluid as it flows between the first port 40 and the second opening 84 of second flow barrier 78. Therefore, the heat transfer fluid received into the second U-shaped flow area 90 through second opening 84 is at a higher temperature than the heat transfer fluid being supplied to the first U-shaped flow area 88 through first (inlet) port 40. This temperature differential between the heat transfer fluid flowing through the first and second U-shaped flow areas 88, 90 may result in a temperature differential between the battery cells 2 in the first and second rows.

The present embodiment provides features which will minimize the temperature differential between the heat transfer fluid flowing through the first and second U-shaped flow areas 88, 90, thereby improving temperature uniformity of the battery cells 2 in the first and second rows. These features are now described below.

The first and second portions 64, 66 of heat exchanger 10 each include a first bypass channel 92 which allows a portion of the heat transfer fluid entering the heat exchanger 10 through first port 40 to partly or completely bypass the first U-shaped flow area 88, and to flow directly from the first port 40 to the second U-shaped flow area 90. The directions in which the flow is split between first bypass channel 92 and first flow section 68 is illustrated by the arrows in FIG. 8. These arrows only show the directions of flow, and not the exact location of the flow channels through which the fluid flows. In this regard, the transverse arrow of FIG. 8 merely indicates the direction of fluid flow through first bypass channels 92, and is displaced along the y-axis from the first bypass channels 92. The relatively cold heat transfer fluid entering the second U-shaped flow area 90 through first bypass channel 92 mixes with the warmer heat transfer fluid entering the second U-shaped flow area 90 through the second opening 84, thereby lowering the temperature of the total amount of heat transfer fluid entering the second U-shaped flow area 90. This has the effect of reducing the temperature differential between the heat transfer fluid flowing through the first and second U-shaped flow areas 88, 90, thereby improving temperature uniformity of the battery cells 2 in the first and second rows.

In the present embodiment, the first bypass channel 92 extends transversely from the area of first port 40 directly to the first end of one of the intermediate flow sections 70, 72, and specifically the first end of the third flow section 72. It will be appreciated, however, that the first bypass channel 92 could instead deliver the cold heat transfer fluid directly into the first end of the second flow section 70, and/or directly to the second opening 84 between the second and third flow sections 70, 72. It will be appreciated that the amount of heat transfer fluid which is diverted through the first bypass channel 92 will be determined by the width of the bypass channel 92, relative to the width of the channel through which the heat transfer fluid from first port 40 enters the first end of the first flow section 68.

As also shown in FIG. 4B, the present embodiment also includes a second bypass channel 94, which branches off from the first U-shaped flow area 88 and diverts a portion of the heat transfer fluid to the second U-shaped flow area 90. In the present embodiment, the second bypass channel 94 is relatively narrow compared to the widths of the flow sections 68, 70, 72, 74, and has a first end 96 and a second end 98. The first end 96 is located along an outer edge of the first flow section 68, immediately adjacent to the planar flange 28, and between the first and second ends of the first flow section 68, such that second bypass channel 94 receives heat transfer fluid from first port 40 and/or the first flow section 68. From the first end 96, the second bypass channel 94 extends along the outer edge of the second plate 18, immediately adjacent to the planar flange 28, along the side edge 25, along the end edge 44, and along the side edge 26. The second end 98 of the second bypass channel 94 is located along an outer edge of the fourth flow section 74, such that second bypass channel 94 delivers heat transfer fluid to the fourth flow section 74. In the present embodiment, the second end 98 is located at the first end of the fourth flow section 74, proximate to second port 42. The second bypass channel 94 is defined between the planar flange 28 and a peripheral rib 95 extending from the first end 96 to the second end 98 of the second bypass channel 94, and is substantially parallel to the planar flange 28, along side edge 25, end edge 44 and side edge 26. In the present embodiment, the portion of peripheral rib 95 extending along side edge 25 is thicker than other portions of peripheral rib 95, for reasons which will be explained below. It can be seen that the second flow barrier 78 is joined to the portion of the peripheral rib 95 extending along end edge 44. The peripheral rib 95 is shown in the drawings as being continuous, however, it may include one or more gaps to permit fluid communication with one or more of the flow sections 68, 70, 72, 74, if desired. For example, FIG. 4B illustrates a gap 97 in dashed lines, to permit communication between second bypass channel 94 and flow section 74.

It can be seen that the second bypass channel 94 is adapted to deliver relatively cool heat transfer fluid around the outer periphery of the second plate 18, and around the outer peripheries of the first and second U-shaped flow areas 88, 90. This will also assist in lowering the temperature differential between the first and second U-shaped flow areas 88, 90, thereby improving temperature uniformity of the battery cells 2 in the first and second rows. In embodiments where the peripheral rib 95 is continuous, the heat transfer fluid flowing through second bypass channel 94 may not mix with the heat transfer fluid in second U-shaped flow area 90 until it is close to the second port 42, depending on the location of second end 98, the fluid in second bypass channel 94 may be heated somewhat by conduction of heat through the first and second plates 12, 18.

It will be appreciated that the first end 96 of the second bypass channel 94 may be located at any point along the outer edge of the first flow section 68 between its first and second ends, and the second end 98 of the second bypass channel 94 may similarly be located at any point along the outer edge of the fourth flow section 74 between its first and second ends. For example, in some embodiments, the first end 96 of second bypass channel 94 may be located immediately adjacent to first port 40 and the second end 98 of second bypass channel 94 may be located immediately adjacent to second port 42.

The bottoms and sides of the flow sections 68, 70, 72, 74 and bypass channels 92, 94 comprise grooves or channels formed in the central area 24 of second plate 18, the grooves or channels being defined by the plurality of embossments illustrated in FIG. 4B. The embossments shown in FIG. 4B all have top sealing surfaces which may be flat (see FIG. 6) or rounded, and which are co-planar with the planar flange 28, such that the sealing surfaces of the embossments are sealingly joined to the inner surface 14 of first plate 12, in the same manner as the sealing surface 30 defined by the planar flange 28.

As mentioned above, FIG. 4B shows only some of the features of the second plate 18, while FIG. 4A shows that the second plate 18 includes additional embossments which define support elements and/or flow enhancing features. These additional features are now described below.

FIG. 4A shows that the second plate 18 includes a plurality of embossments in the form of elongated support ribs or circular dimples, which are identified by reference numeral 100 and identified herein as "support elements". The support elements 100 strengthen areas of heat exchanger 10 in which there are no other embossments to provide structural support for the first and second plates 12, 18, such as at the first and second ends of one or more of flow sections 68, 70, 72, 74, these areas providing manifold spaces in which the heat transfer fluid may be transversely distributed across the widths of the flow sections 68, 70, 72, 74. Support elements 100 may also be provided in or proximate to the first, second and third openings 82, 84, 86 of the flow barriers 76, 78, 80. It will be appreciated that the support elements 100 may also provide flow enhancement, such as to increase turbulence and/or break up boundary layers.

In addition to support elements 100, FIG. 4A also shows that the second plate 18 includes a plurality of embossments which divide each of the flow sections 68, 70, 72, 74 into a plurality of discrete flow channels. These embossments are identified by reference numeral 102 and identified herein as "channel ribs", and the flow channels between the channel ribs 102 are identified by reference numeral 104. The channel ribs 102 extend at least generally longitudinally between the first and second ends of the flow sections 68, 70, 72, 74.

It can be seen from FIG. 4A that the numbers and widths of the channel ribs 102 are varied between the various flow sections 68, 70, 72, 74, and may also vary somewhat within at least some of the flow sections 68, 70, 72, 74. This has the effect of varying the width and number of the flow channels 104 in the flow sections 68, 70, 72, 74. In addition, the heat exchanger 10 may include one or more flow obstructing embossments, described below, to vary the heat transfer areas of the flow sections 68, 70, 72, 74, wherein the heat transfer area of each flow section 68, 70 is defined as the area of that flow section through which heat transfer fluid flows.

The primary reason for varying the number and width of the flow channels 104, and/or varying the heat transfer areas of flow sections 68, 70, 72, 74, is to provide improved temperature uniformity between the flow sections making up each of the U-shaped flow areas 88, 90, i.e to provide improved temperature uniformity between the first and second flow sections 68, 70 making up the first U-shaped flow area 88; and to provide improved temperature uniformity between the third and fourth flow sections 72, 74 making up the second U-shaped flow area 90.

Such variation in the number and width of channels, and/or the heat transfer areas, in a U-shaped flow area is described in detail in commonly assigned U.S. Provisional Patent Application No. 62/682,610 filed on Jun. 8, 2018 and entitled "UTILIZATION OF DEAD CHANNEL TO IMPROVE TEMPERATURE UNIFORMITY ON THERMAL INTERFACE MATERIAL", which is incorporated herein by reference in its entirety.

In the first U-shaped flow area 88 of heat exchanger 10, it can be seen that the first flow section 68 includes two channel ribs 102, such that the first flow section 68 includes three flow channels 104 (not including second bypass channel 94), which may have similar widths along part or all of their length. One of the channel ribs 102 in the first flow section 68 is relatively wider than the other channel rib 102. Also, the greater width of peripheral rib 95 along the side edge 25, and/or the greater width of flange 28 along side edge 25 and in the area between inlet port 40 and first end 96 of second bypass channel 94, cause some additional reduction of heat transfer area in the first flow section 68.

The second flow section 70 of first U-shaped flow area 88 has a more regular rib pattern formed by two straight, elongate channel ribs 102, such that the second flow section 70 includes three straight, longitudinal flow channels 104 which may have similar or substantially the same width.

In addition, a significant portion of the first end of the first flow section 68, proximate to the first port 40, is occupied by a first flow obstructing embossment 106 which forms part of the first flow barrier 76, and which includes a transverse extension rib 106a which partially defines the first bypass channel 92. Together, the relatively wide channel rib 102 and the first flow obstructing embossment 106 provide the first flow section 68 with a smaller heat transfer area than that of the second flow section 70, and the inventors have found that this reduction in heat transfer surface area of the first flow section 68 relative to the second flow section 70 can improve temperature uniformity between the first and second flow sections 68, 70, thereby improving temperature uniformity of the battery cells 2 within the first row of battery cells 2, which are in thermal contact with the first U-shaped flow area 88.

In the second U-shaped flow area 90 of heat exchanger 10, it can be seen that the third flow section 72 includes three channel ribs 102, such that the third flow section 72 includes four flow channels 104, which may have similar widths along part or all of their length. Two of the channel ribs 102 in the third flow section 68 are relatively wider than the other channel rib 102.

The fourth flow section 74 of second U-shaped flow area 90 has a more regular rib pattern than the third section 72, the rib pattern being formed by three straight, elongate channel ribs 102 (excluding the embossment separating flow section 74 from second bypass channel 94), such that the second flow section 70 includes four straight, longitudinal flow channels 104 of similar or substantially the same width.

In addition, a significant portion of the first end of the third flow section 72, proximate to the second opening 84 and the first bypass channel 92, is occupied by a second flow obstructing embossment 108 which forms part of the third flow barrier 80, and which includes a transverse extension rib 108a which partially defines the first bypass channel 92, and is located between and parallel to the two transverse rib extensions 106a of first flow obstructing embossment 106. As shown in FIG. 4A, the second flow obstructing embossment 108 extends across the central plane P such that a portion of embossment 108 is located in each of the first and second portions 64, 66 of heat exchanger 10. Together, the relatively wide channel ribs 102 and the second flow obstructing embossment 108 provide the third flow section 72 with a smaller heat transfer area than the fourth flow section 74, to reduce the heat transfer area of the third flow section 72 relative to the fourth flow section 74.

The embossments forming the support ribs 100, channel ribs 102, and the flow obstructing embossments 106, 108 all have top sealing surfaces which may be flat (see FIG. 6) or rounded, and which are co-planar with the planar flange 28, such that the sealing surfaces of these embossments are sealingly joined to the inner surface 14 of first plate 12, in the same manner as the sealing surface 30 defined by the planar flange 28.

Figure 9:
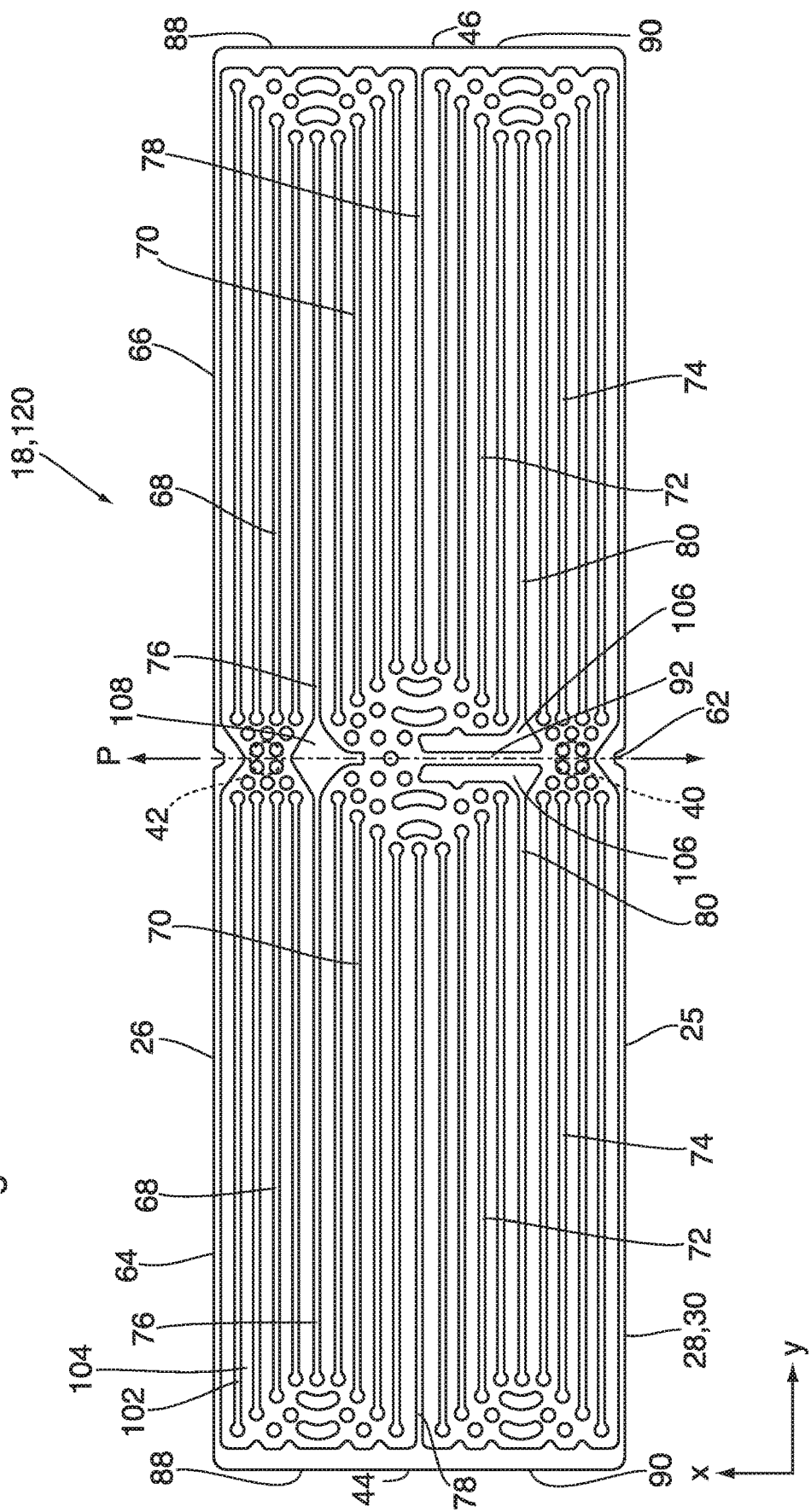
FIG. 9 is a top plan view of a bottom plate of a heat exchanger according to a second embodiment.

FIG. 9 illustrates the second plate 18 of a heat exchanger 120 according to a second embodiment. The second plate 18 of heat exchanger 120 shares a number of like elements with the second plate 18 of heat exchanger 10 described above, and these like elements are identified with like reference numerals in FIG. 9. In addition, the above descriptions of these like elements apply equally to heat exchanger 120, unless otherwise indicated below.

The second plate 18 shown in FIG. 9 includes a more regular pattern of channel ribs 102 in flow sections 68, 70, 72, 74 than that of heat exchanger 10. In this regard, each flow section 68, 70, 72, 74 includes four straight, longitudinal channel ribs 102, such that all four flow sections 68, 70, 72, 74 include five straight, longitudinal flow channels 104 of substantially the same width. In addition the second plate 18 of FIG. 9 includes a first bypass channel 92, but lacks a second bypass channel 94. Also, it can be seen from FIG. 9 that the first bypass channel 92 feeds both portions 64, 66 of heat exchanger 10, in contrast to heat exchanger 10 which includes a first bypass channel 92 in each of the portions 64, 66.

Figure 10:
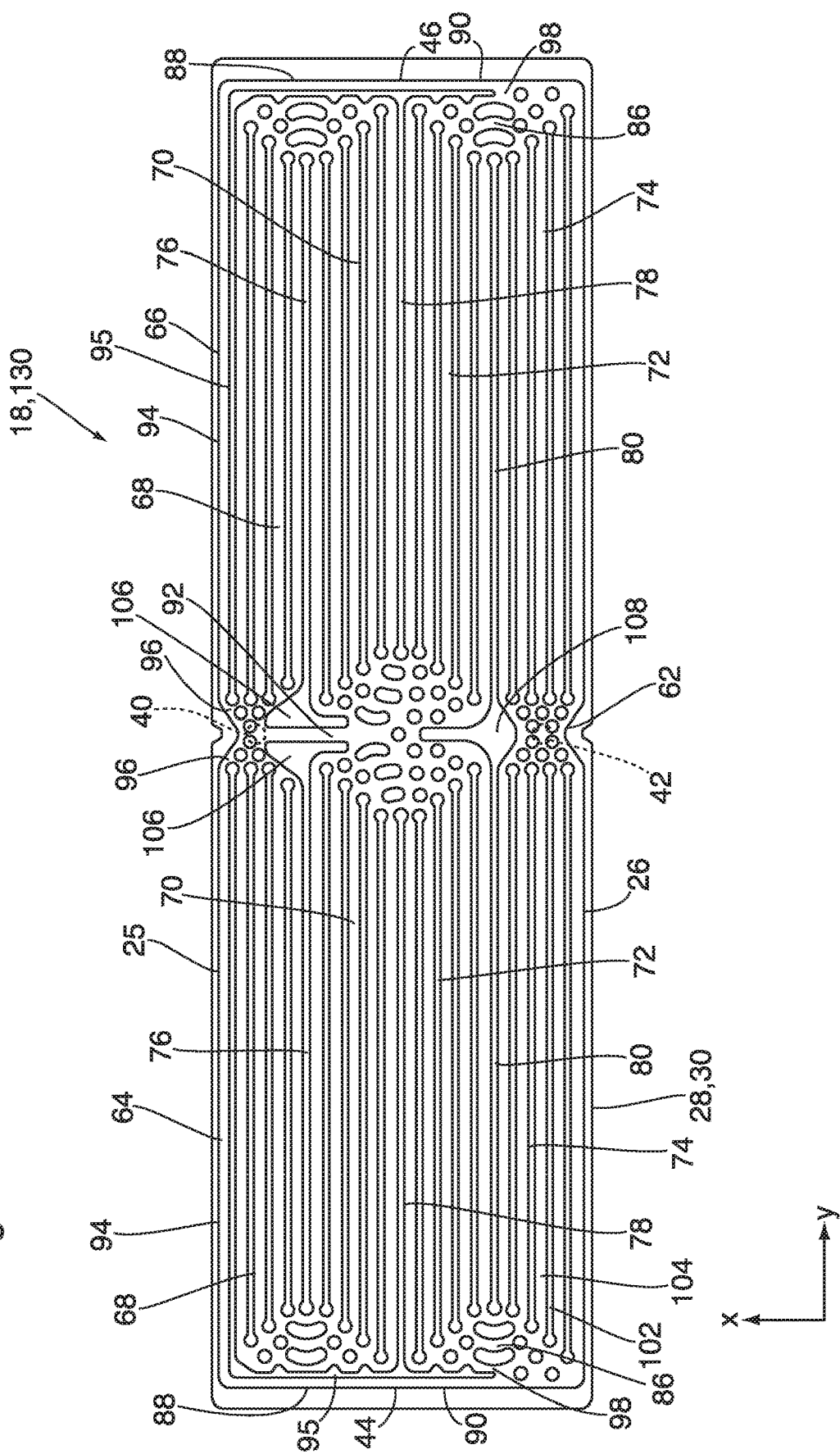
FIG. 10 is a top plan view of a bottom plate of a heat exchanger according to a third embodiment.

FIG. 10 illustrates the second plate 18 of a heat exchanger 130 according to a third embodiment. The second plate 18 of heat exchanger 130 shares a number of like elements with the second plates 18 of heat exchangers 10 and 120 described above, and these like elements are identified with like reference numerals in FIG. 10. In addition, the above descriptions of these like elements apply equally to heat exchanger 130, unless otherwise indicated below.

The second plate 18 shown in FIG. 10 includes a regular pattern of channel ribs 102 in flow sections 68, 70, 72, 74, similar to that shown in FIG. 9. In this regard, each of the second, third and fourth flow sections 70, 72, 74 includes four straight, longitudinal channel ribs 102, such that these three flow sections 70, 72, 74 include five straight, longitudinal flow channels 104 of substantially the same width.

The first flow section 68 of the second plate 18 shown in FIG. 10 includes three straight, longitudinal channel ribs 102, such that the first flow section 68 includes four straight, longitudinal flow channels 104 of substantially the same width.

The second plate 18 of FIG. 10 includes a first bypass channel 92 which delivers cold heat transfer fluid transversely from the first port 40 to the second opening 84, and/or to the first ends of one or both of the second and third flow sections 70, 72.

In addition, the second plate 18 of FIG. 10 includes a second bypass channel 94 extending from the first end of the first flow section 68, along the side edge 25, and end edge 26, and terminating at the third opening 86, and/or the second ends of one or both of the third and fourth flow sections 72, 74. The second bypass channel 94 is defined between the peripheral rib 95 and planar flange 28. Therefore, in the present embodiment, the relatively cool fluid carried in the second bypass channel 94 is mixed with the heat transfer fluid flowing through the second U-shaped flow area 90, in the vicinity of the second end of the fourth flow section 74, rather than at the first end of flow section 74, as in heat exchanger 10.

Although the heat exchangers described herein are cold plates, it will be appreciated that ICE plate heat exchangers are also within the scope of the present disclosure. In this regard, an ICE plate heat exchanger may be constructed from two mirror image shaped plates similar or identical to second plates 18 described above, and optionally having "side-entry" first and second fittings projecting from one of the edges of the heat exchanger.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger having a length and a width and comprising a plurality of flow sections separated by flow barriers;

wherein each said flow section has a first end and a second end spaced apart along the length of the heat exchanger;

wherein the flow sections are arranged side-by-side along the width of the heat exchanger and adjacent pairs of said flow sections are in flow communication with each other through openings in said flow barriers;

wherein said plurality of flow sections includes an inlet flow section, an outlet flow section, and at least first and second intermediate flow sections between the inlet flow section and the outlet flow section;

wherein the heat exchanger further comprises:

an inlet port in flow communication with a first end of the inlet flow section;

an outlet port in flow communication with the outlet flow section; and a first bypass channel extending between the inlet port and at least one of the intermediate flow sections, wherein the first bypass channel does not extend beyond the at least one of the intermediate flow sections.

2. The heat exchanger according to claim 1, comprising an even number of said intermediate flow sections, such that the heat exchanger defines a plurality of U-shaped flow areas, such that the outlet port is in flow communication with the first end of the outlet flow section, wherein the plurality of U-shaped flow areas comprises a first U-shaped flow area and a second U-shaped flow area,
 wherein the first U-shaped flow area comprises the inlet flow section and a first said intermediate flow section, wherein a first said opening provides flow communication between the second end of the inlet flow section and the first said intermediate flow section,
 wherein the second U-shaped flow area comprises a second said intermediate flow section and the outlet flow section, and wherein a third said opening provides flow communication between the second end of the second said intermediate flow section and the outlet flow section.

3. The heat exchanger according to claim 2, wherein the first bypass channel extends transversely from the inlet port to the first end of at least one of the first and second intermediate flow sections.

4. The heat exchanger according to claim 2, wherein the first bypass channel extends transversely from the inlet port to a second said opening through which flow communication is provided between the first end of the first intermediate flow section and the first end of the second intermediate flow section.

5. The heat exchanger according to claim 2, further comprising a second bypass channel which branches off from the first U-shaped flow area and extends to the second U-shaped flow area.

6. The heat exchanger according to claim 5, wherein the second bypass channel has a first end in flow communication with the inlet flow section between the first and second ends thereof, and a second end in flow communication with the outlet flow section between the first and second ends thereof.

7. The heat exchanger according to claim 6, wherein the heat exchanger comprises a first flat plate and a second shaped plate having an outer peripheral flange along which it is sealingly joined to the first plate, the heat exchanger having a pair of opposed, longitudinally-extending side edges and a pair of opposed, transversely-extending end edges;
 wherein the second bypass channel extends longitudinally along one a first one of the side edges, between the inlet flow section and the outer peripheral flange of the second plate; and
 wherein the second bypass channel further extends transversely along one of the end edges, between the second ends of the flow sections and the peripheral flange of the second plate.

8. The heat exchanger according to claim 7, wherein the second end of the second bypass channel is located at the second end of the second intermediate flow section, the second end of the outlet flow section, and/or the third opening between the second ends of the second intermediate flow section and the outlet flow section.

9. The heat exchanger according to claim 7, wherein the second bypass channel further extends longitudinally along a second one of the side edges, between the outlet flow section and the outer peripheral flange of the second plate.

10. The heat exchanger according to claim 9, wherein the second end of the second bypass channel is located between the first and second ends of the outlet flow section.

11. The heat exchanger according to claim 9, wherein the second end of the second bypass channel is located at the first end of the outlet flow channel, and/or proximate to the outlet port.

12. The heat exchanger according to claim 7, wherein the second bypass channel is defined between the outer peripheral flange and a peripheral rib extending from the first end to the second end of the second bypass channel;
 wherein the peripheral rib is continuous or includes one or more gaps to permit fluid communication with one or more of the flow sections.

13. The heat exchanger of claim 2, wherein each of the flow sections defines a heat transfer area defined as an area of the said flow section adapted to permit flow therethrough of a heat transfer fluid;
 wherein the inlet flow section has a smaller heat transfer area than the first intermediate flow section; and
 wherein the second intermediate flow section has a smaller heat transfer area than the outlet flow section.

14. The heat exchanger according to claim 13, wherein the heat exchanger comprises a first flat plate and a second shaped plate having an outer peripheral flange along which it is sealingly joined to the first plate,
 wherein the second plate includes one or more embossments in the inlet flow section and the second intermediate flow section which are adapted to reduce the heat transfer area in each of the inlet flow section and the second intermediate flow section relative to the respective first intermediate flow section and the outlet flow section, wherein said one or more embossments in the second plate include first and second flow obstructing embossments, wherein the first flow obstructing embossment is located at the first end of the inlet flow section, and the second flow obstructing embossment is located at the first end of the second intermediate flow section.

15. The heat exchanger according to claim 2, wherein each of the flow sections comprises a plurality of channel ribs which divide each of the flow sections into a plurality of longitudinally extending flow channels.

16. The heat exchanger according to claim 15, wherein the number and/or width of the channel ribs is varied between the inlet flow section and the first intermediate flow section, and/or between the second intermediate flow section and the outlet flow section.

17. The heat exchanger according to claim 16, wherein the number of said channel ribs in the inlet flow section is less than the number of said channel ribs in the first intermediate flow section; and/or
 the number of said channel ribs in the second intermediate flow section is less than the number of said channel ribs in the outlet flow section.

18. The heat exchanger according to claim 16, wherein at least one of the channel ribs in the inlet flow section is wider than each of said channel ribs in the first intermediate flow section; and/or
 at least one of said channel ribs in the second intermediate flow section is wider than each of said channel ribs in the outlet flow section.

19. The heat exchanger according to claim 2, wherein the heat exchanger comprises a first flat plate and a second shaped plate having an outer peripheral flange along which it is sealingly joined to the first plate, the heat exchanger having a pair of opposed, longitudinally-extending side edges and a pair of opposed, transversely-extending end edges; and wherein each of the first and second U-shaped flow areas is adapted to underly a row of battery cells provided in thermal contact with an outer surface of the first flat plate of the heat exchanger.

20. The heat exchanger according to claim 19, wherein the inlet and outlet ports are provided in the first plate and are located in a central area of the heat exchanger, outside an area of the first plate which is adapted to be in thermal contact with said battery cells, wherein the inlet and outlet ports are located along a transverse mirror plane which bisects the heat exchanger into first and second portions, wherein the first and second portions are mirror images of one another, wherein the first end of each said flow section is located in the central area of the heat exchanger, and the second end of each said flow section is located proximate to one of the end edges.

* * * * *